United States Patent
Chabaud et al.

(10) Patent No.: US 10,557,920 B2
(45) Date of Patent: Feb. 11, 2020

(54) METHOD FOR BLINDNESS RECOGNITION IN RADAR SENSORS FOR MOTOR VEHICLES

(71) Applicant: Robert Bosch GmbH, Stuttgart (DE)

(72) Inventors: Maija Chabaud, Ludwigsburg (DE); Volker Gross, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 283 days.

(21) Appl. No.: 15/799,722

(22) Filed: Oct. 31, 2017

(65) Prior Publication Data

US 2018/0143299 A1 May 24, 2018

(30) Foreign Application Priority Data

Nov. 23, 2016 (DE) .................. 10 2016 223 068

(51) Int. Cl.
| | |
|---|---|
| G01S 7/40 | (2006.01) |
| G01S 7/35 | (2006.01) |
| G01S 13/93 | (2006.01) |
| G01S 7/41 | (2006.01) |
| G01S 13/931 | (2020.01) |

(52) U.S. Cl.
CPC ............ *G01S 7/4021* (2013.01); *G01S 7/354* (2013.01); *G01S 13/931* (2013.01); *G01S 7/411* (2013.01); *G01S 7/412* (2013.01); *G01S 2007/4039* (2013.01)

(58) Field of Classification Search
CPC ........ G01S 13/931; G01S 7/411; G01S 7/354; G01S 7/412; G01S 7/023; G01S 7/4021; G01S 13/536; G01S 2007/4039; G01S 2013/9375; G01S 2007/4082; G01N 21/6486; H01Q 21/00
See application file for complete search history.

(56) References Cited

U.S. PATENT DOCUMENTS

| 6,087,995 | A * | 7/2000 | Grace ................... G01S 7/4017 |
| | | | 340/903 |
| 8,730,098 | B1 * | 5/2014 | Fox ........................ G01S 13/04 |
| | | | 342/175 |
| 2003/0016161 | A1 * | 1/2003 | Okai ........................ G01S 7/40 |
| | | | 342/70 |
| 2005/0093736 | A1 * | 5/2005 | Fukute .................... G01S 7/354 |
| | | | 342/70 |
| 2009/0040098 | A1 * | 2/2009 | Lee ........................ G01S 7/412 |
| | | | 342/175 |

FOREIGN PATENT DOCUMENTS

| DE | 19945268 A1 | 3/2001 |
| WO | 01/22113 A1 | 3/2001 |

* cited by examiner

*Primary Examiner* — Olumide Ajibade Akonai
(74) *Attorney, Agent, or Firm* — Norton Rose Fulbright US LLP; Gerard Messina

(57) ABSTRACT

A method for determining a degree of blindness of a radar sensor in a motor vehicle on the basis of a measurement of the receive power level of a radar echo, including the following steps that are carried out when at least one object is located by the radar sensor: determining an expected value for the radar scatter cross-section of the object on the basis of known properties of objects to be located; estimating the radar scatter cross-section of the located object on the basis of the measured receive power level; and calculating an indicator for the degree of blindness of the radar sensor as a monotonically increasing function of the difference between the estimated radar scatter cross-section and the expected value.

6 Claims, 2 Drawing Sheets

METHOD FOR BLINDNESS RECOGNITION IN RADAR SENSORS FOR MOTOR VEHICLES

CROSS REFERENCE

The present application claims the benefit under 35 U.S.C. § 119 of German Patent Application No. DE 102016223068.9 filed on Nov. 23, 2016, which is expressly incorporated herein by reference in its entirety.

FIELD

The present invention relates to a method for determining a degree of blindness of a radar sensor in a motor vehicle on the basis of a measurement of the receive power level of a radar echo.

BACKGROUND INFORMATION

Radar sensors are used in motor vehicles to acquire the surrounding traffic, and supply location data such as distances, relative speeds, and directional angles of objects in the environment surrounding the vehicle. These location data are used as a basis for various driver assistance functions, such as automatic distance regulation, a collision warning system, or a collision avoidance system. The location data of such radar sensors are also required in systems for autonomous driving.

In disadvantageous conditions, for example when a coating of slush forms on the radome of the radar sensor during heavy snowfall, the radar signals can be attenuated so strongly that in practical terms the radar sensor is blinded. Because the functions based on the location data of the radar sensor are relevant for safety, the radar sensor should be closely monitored for possible blindness during operation.

German Patent Application No. DE 199 45 268 A1 and PCT Application. No. WO 01/22113 A1 describe methods in which the average power of the signals received by the radar sensor is used as an indicator for radar sensor blindness recognition. This indicator is based on the idea that as the blindness of the sensor increases, the power level it can accept from the outside will decrease. In an FMCW radar unit, this indicator can be improved by varying the transmit power during the transmission of at least two successive, identical frequency ramps. Here, the identical ramps are traversed one after the other with different transmit power levels, and the power levels received by the sensor and averaged are compared to one another.

However, the indicators enable only a quasi-binary judgement to be made as to whether the sensor is absorptively coated or not. As the demands made by assistance functions on sensor coating recognition increase (especially in systems for autonomous driving), there is increasing interest in finding an answer to the question how strongly the sensor is coated, and whether the requested function can still be carried out given the existing coating.

SUMMARY

An object of the present invention is to provide a method that enables a more reliable quantitative determination of the degree of blindness of the radar sensor.

The method according to the present invention for achieving this object includes the following steps that are carried out when at least one object is located by the radar sensor:

determination of an expected value for the radar scatter cross-section of the object on the basis of known properties of objects to be located, estimation of the radar scatter cross-section of the located object on the basis of the measured receive power level, and calculation of an indicator for the degree of blindness of the radar sensor as a monotonically increasing function of the difference between the estimated radar cross-section and the expected value.

The present invention makes use of the fact that the radar scatter cross-sections of the objects typically located by a radar sensor in a motor vehicle are usually known. In most cases, the located object is the rear surface of a passenger vehicle traveling in front, and because the radar scatter cross-sections of various passenger vehicles differ from one another only slightly, the average scatter cross-section of these vehicles can be used as an expected value.

The actual radar scatter cross-section S of an object currently being located is given by the equation:

$$S = P\_t \ast (P\_R \ast G^2 \ast \lambda)/(R4 \ast (4\pi)^3)$$

where
$P\_r$ is the receive power level, i.e. the power level of the radar echo received from a located object;
$P\_t$ is the known transmit power of the radar sensor;
$\lambda$ is the wavelength (also known) of the radar radiation;
$G$ is the known antenna gain (one-way gain, for transmission and for reception), and
$R$ is the distance between the radar sensor and the located object.

The distance R can be measured immediately by the radar sensor. The receive power level $P\_r$ can also be measured immediately in the radar sensor. For example, in an FMCW radar unit, the received radar echo is mixed with a portion of the transmit signal, and the mixed product is subjected to a Fourier transformation. In this way, a spectrum is obtained in which each located object is shown as a peak at a particular frequency. The receive power level for a located object can consequently be determined by integrating the spectrum over the frequency range occupied by the peak. In digital signal evaluation, the frequency space is subdivided into individual frequency bins. In general, the peak will be situated within a single frequency bin, so that the receive power level is then given immediately by the value of the spectrum in this bin.

Because all quantities occurring in the equation given above are thus known or capable of being measured, in principle an estimation of the radar scatter cross-section of the object can be carried out every time an object is located. This estimated radar scatter cross-section can then be compared with the expected value. The greater the degree of blindness of the radar sensor is, the more strongly the estimated scatter cross-section will fall below the expected value. The difference between the estimated radar cross-section and the expected value thus forms an indicator for the degree of blindness. Any other monotonically increasing function of the difference between the estimated radar scatter cross-section and the expected value can also be used as the indicator.

An advantage of the method is that what is obtained as a result is not merely a yes/no statement, but rather an indicator that quantitatively indicates the degree of blindness of the radar sensor. This makes it possible to make a more differentiated evaluation of the availability of the radar sensor for various assistance or control functions, and of the reliability of the location data obtained from the radar sensor.

A further advantage is that the indicator obtained in this way of the blindness of the radar sensor is largely independent of the influence of temperature and aging, and is also largely independent of the location of installation of the radar sensor, and of the design of the particular radar sensor.

Advantageous embodiments and developments of the present invention are described herein.

As an indicator of the degree of blindness of the radar sensor, a range prefactor can advantageously be used that indicates the percent of the decrease in the range of the radar sensor as a result of the partial blindness.

The reliability and precision of the indicator can be increased by repeating the determination or estimation of the indicator for a large number of measurements of various objects, and then statistically evaluating the results. In general, a plurality of objects are located at the same time during a measurement cycle. In this case, it is also possible to combine the values for the radar scatter cross-sections of the individual objects to form a single value, for example by averaging, formation of a histogram, or using a core density estimator with a subsequent maximum search, so that only a single range prefactor is obtained per measurement cycle.

In order to further improve the precision, auxiliary algorithms can be used that distinguish between different object types and/or situations (e.g., location of an object at a large azimuth angle and, consequently, with different reflection properties of the object), and the expected value can be adapted to the object type or to the situation as a function of the model.

If the radar sensor is used to carry out a plurality of assistance or control functions, then on the basis of the obtained value for the indicator it can be decided independently for each individual function, taking into account the current traffic situation if warranted, whether the reliability of the radar sensor is still adequate for this function.

For example, if the range of the radar sensor is reduced, the distance regulation function can be switched off during travel at higher speed, while the radar sensor can continue to be used for a stop and go function in a situation of congested traffic.

The present invention also includes a radar sensor that is designed to carry out the method described above.

Below, an exemplary embodiment is explained in more detail on the basis of the figures.

DETAILED DESCRIPTION OF EXAMPLE EMBODIMENTS

Figure 1:
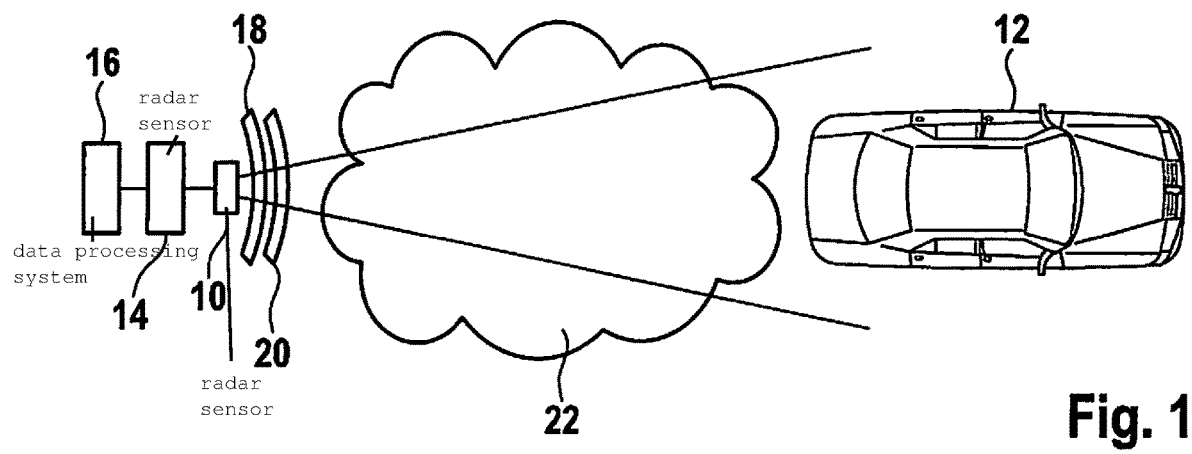
FIG. 1 shows a diagram of a location process with a radar sensor.

FIG. 1 shows a radar sensor 10 that is installed in the front part of a motor vehicle (not shown), and that is used to locate objects 12, such as vehicles traveling in front, and to measure their distances, relative speeds, and direction angles. A particular angular resolution capacity of radar sensor 10 also makes it possible to distinguish between broader and narrow objects, so that for example it can also be determined to what class of objects object 12 belongs, for example whether it is a passenger vehicle, a truck, or a two-wheeled vehicle, or possibly also a traffic sign at the edge of the roadway.

An electronic evaluation and control device 14 is used to control radar sensor 14 and to evaluate the received signals. The data ascertained in this way concerning the surrounding traffic situation are communicated, in digital form, to a data processing system 16 in which various driver assistance functions and/or autonomous vehicle guidance functions are implemented, for example an automatic distance regulation for regulating the distance from the vehicle traveling in front, a collision warning system, and/or a collision avoidance system.

Radar sensor 10 is installed behind a radome 18, for example a part of the vehicle body that is transparent to radar radiation. In the depicted example, a coating of dirt 20 is shown schematically that is situated on the surface of radome 18. Because a certain portion of the transmitted radar signal, and also a certain portion of the radar echo received from object 12, is absorbed by radome 18 and by dirt coating 20, the radome and the dirt coating represent absorbers that decrease the sensitivity of the radar sensor. A further absorber is formed by the atmosphere 22 (here shown symbolically) between radar sensor 10 and object 12, which also absorbs a part of the radar radiation, in particular when there are unfavorable weather conditions such as heavy rain or snow. Under unfavorable conditions, for example the accumulation of slush on radome 18, the overall effect of the absorbers can become so strong that radar sensor 10 is practically completely blinded, and thus the assistance functions based on the data of the radar sensor are no longer available, or at least no longer operate with the required degree of reliability. Even given a lesser degree of impairment of the sensitivity of the radar sensor, the reliability of the assistance functions can already be limited so strongly that these functions have to be switched off and the driver has to be prompted to take over control. The threshold at which an assistance function has to be switched off can be a function of the type and relevance of the respective function, and, if warranted, of the current traffic situation.

As a measure of the sensitivity of the radar sensor, a range prefactor K can be formed that indicates how strongly the range of the radar sensor 10 is reduced due to the absorbers, compared to the full range that can be achieved under ideal conditions. Here, the "range" of the radar sensor is to be understood as that distance R between the radar sensor and an object at which a standard object can just still be located. If R_max is the maximum range that can be achieved under ideal conditions, then the following holds for the current range R_akt:

$$R\_akt = K * R\_max$$

The range prefactor K thus varies in general between 0 and 1, where K=0 means that radar sensor 10 is completely blinded.

In order to measure the current range prefactor K, or at least to estimate it with adequate reliability, during operation of radar sensor 10, it is necessary to estimate the effect of the absorbers that are acting at the current time.

For this purpose, according to the present invention, the fact is exploited that every relevant object 12 has a certain radar scatter cross-section, and that these radar scatter cross-sections are approximately equal at least for objects that belong to the same class. Each object can thus be assigned a certain expected value E for the radar scatter cross-section. In the simplest case, it can be assumed that object 12 is a passenger vehicle whose typical radar scatter cross-section is known, and thus forms expected value E for this object class. The actual radar scatter cross-section S of object 12 is given by the equation:

$$S=P\_t*(P\_R*G^2*\lambda)/(R4*(4\pi)^3)$$

and can consequently be estimated using radar sensor 10 by determining the quantities P_r and R on the basis of the radar signal received for the relevant object.

For the range prefactor, the following then holds approximately:

$$K=10^{(S-E)/40}.$$

Figure 2:
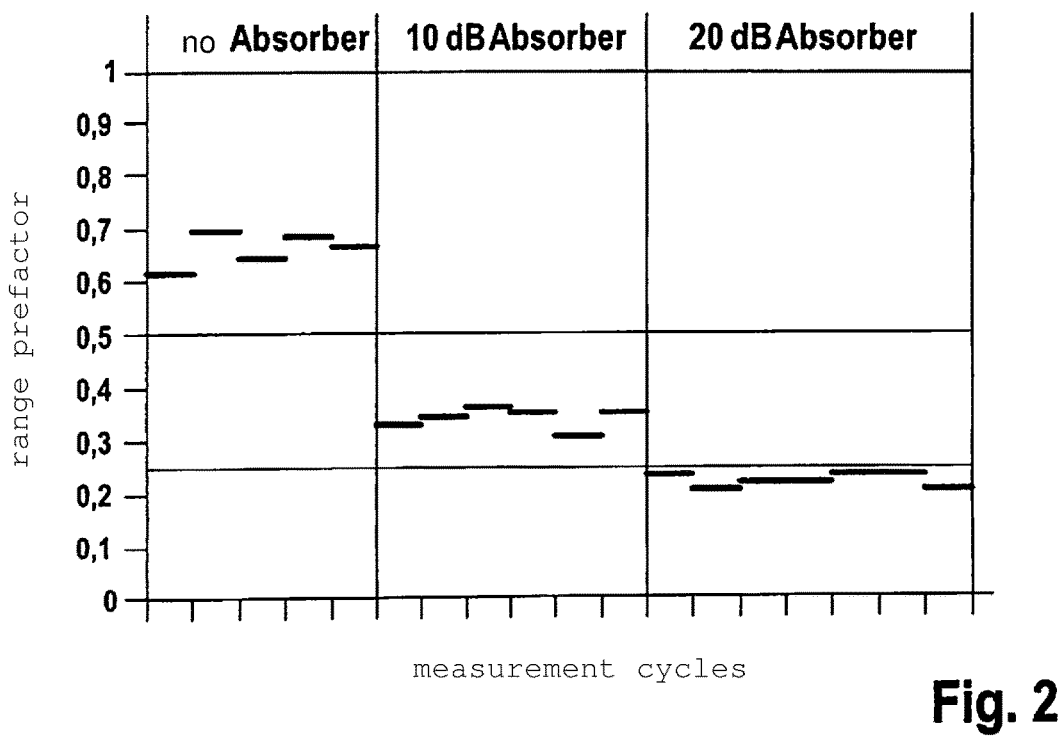
FIG. 2 shows a diagram illustrating measurement results indicating the functional dependence of measured radar scatter cross-sections on a simulated partial blindness of the radar sensor.

FIG. 2 illustrates the results of measurements of range prefactor K with a real radar sensor in which the overall effect of the absorbers (radome 18, coating 20, and atmosphere 22) has been simulated using two different standard absorbers that have an attenuation of 10 dB and 20 dB.

It will be seen that the values obtained for range factor K in different measurement cycles vary from measurement cycle to measurement cycle, but overall show a significant functional dependence on the presence or absence, and the type, of the absorber. In measurements without absorbers, the range prefactor is typically between 0.6 and 0.7, while with the 10 dB absorber it is between 0.3 and 0.4, and with the 20 dB absorber it is between 0.2 and 0.25. These results agree with theory if a standard radar target with realistic properties is assumed as object 12.

In this way, using measurements that can be carried out using radar sensor 10 itself, it is possible to obtain useful information about the current range of this radar sensor.

Because the determination of range prefactor K can be repeated very often—in principle, every time any object is localized—the precision and reliability can be further increased through statistical evaluation. For example, such a statistical evaluation makes it possible to recognize outliers that result when currently located object 12 is not a passenger vehicle, but rather is an object having a larger or smaller scatter cross-section.

In a refinement of the method, the objects can also be subjected to a pre-filtering in order to exclude objects or situations that are not suitable for the measurement of the range prefactor. For example, it is possible to exclude objects for which it is to be expected that the radar scatter cross-section will be falsified by multiple reflections due to the very large distance from the object, or due to indices in the FMCW spectrum. (Such multiple reflections can also have the result that the radar scatter cross-section is overestimated, and a range prefactor K>1 is obtained).

In addition, the angular resolution capacity of radar sensor 10 can be used to estimate the width of the located object, and thus to assign the object to a particular class. For the determination of range prefactor K, the expected value E that holds for this class can then be taken as a basis for the radar scatter cross-section.

Figure 3:
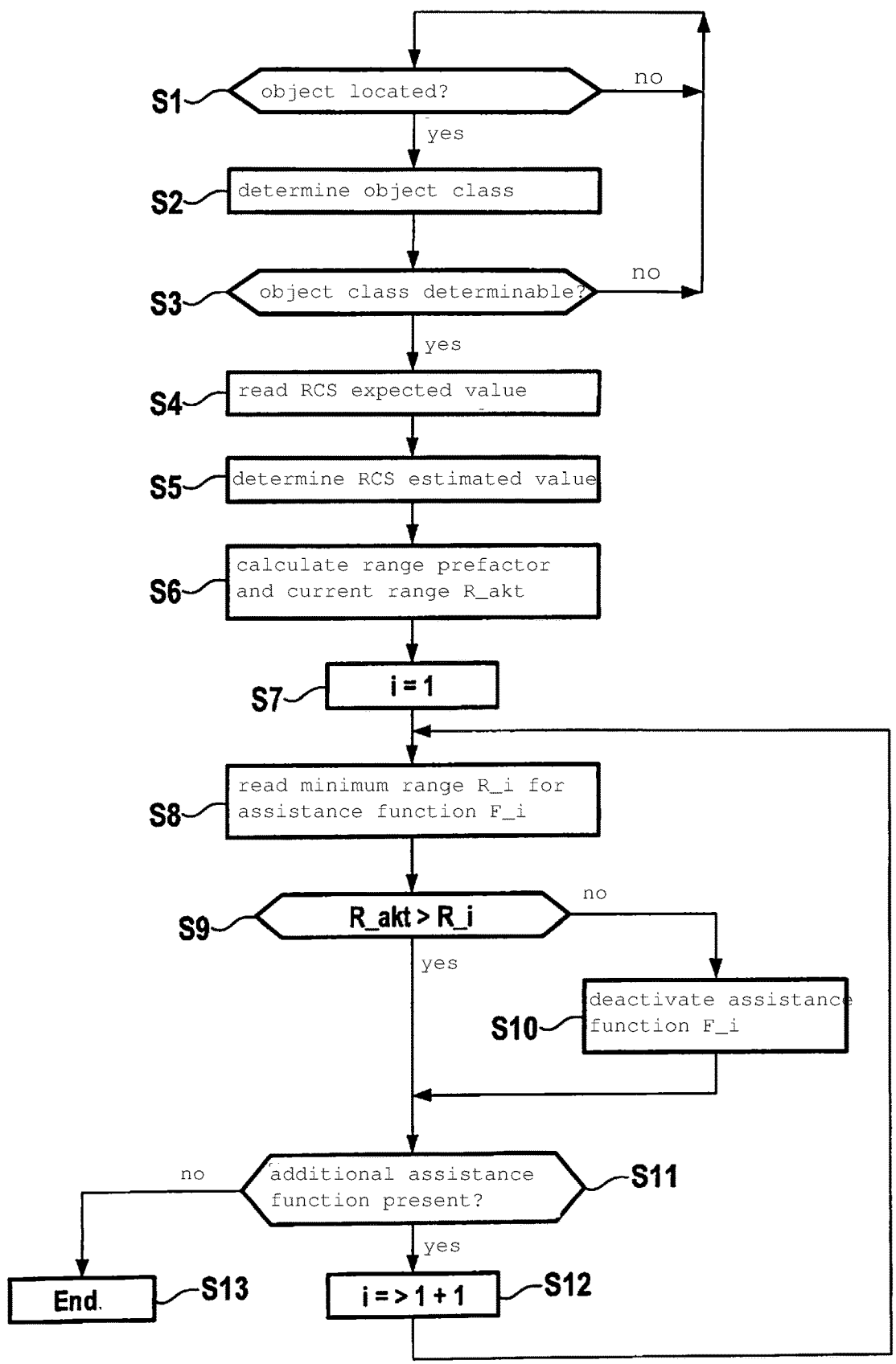
FIG. 3 shows a flow diagram for a method according to the present invention.

An example of a possible method sequence is shown in a flow diagram in FIG. 3. The software required to carry out this method can be implemented in evaluation and control device 14 and/or in data processing system 16.

In step S1 it is checked whether an object is being located. As long as this is not the case (no), this step is cyclically repeated. As soon as an object is located (yes), then in step S2 the object class is determined for this object. Object classes are defined only for those objects 12 for which the associated radar scatter cross-section (expected value E) is known. Objects for which a falsification of the radar scatter cross-section due to interference effects can be expected are not assigned to any of the predefined object classes.

In step S3 it is then checked whether it was possible to assign the object to a particular object class in step S2, so that an unfalsified estimation of the radar scatter cross-section (RCS), and a comparison with an associated expected value, appears to be possible. If this is not the case (no), then a jump takes place back to step S1. Otherwise (yes), in step S4 the expected value E is read for the object class determined in step S2.

In step S5, the estimated value S for the radar scatter cross-section is then calculated by measuring the receive power level P_r and the distance R for the relevant object.

In step S6, the range prefactor K is then calculated on the basis of the data obtained in steps S4 and S5, and through multiplication by the maximum range R_max the current range R_akt of the radar sensor is calculated.

In a modified specific embodiment, steps S1 through S6 are repeated for a plurality of objects in order to achieve a higher degree of precision and reliability through statistical evaluation.

In step S7, a counter i is set to "1." This counter i counts the assistance and control functions F_i implemented in data processing system 16, with the assumption that, for each of these functions, a minimum range R_i is defined that radar sensor 10 must at least have in order for the associated assistance function F_i to be safely useable.

In step S8, the minimum range R_i for the assistance function identified by index i is then read, and in step S9 it is checked whether the condition R_akt>R_i is met or not for this assistance function. If the condition is not met (no), this means that the sensitivity of the radar sensor is not adequate for this specific function, and in step S10 the relevant assistance function is deactivated. The driver is given an indication that the assistance function is no longer available.

If the radar sensor is being used not for a driver assistance system, but for an autonomous driving system, then in step S10 the vehicle is automatically braked to a standstill, and the occupants of the vehicle are prompted to clean the radome or to call a repair service.

If the condition in step S9 is met (yes), step S10 is skipped.

In step S11, it is checked in any case whether at least one further assistance function F_i+1 is also implemented in data processing system 16. If this is the case (yes), then in step S12 counter i is incremented upward by 1, and steps S8 through S11 (and, if warranted, S12), are repeated for the next assistance function. When all the assistance functions have been checked in this way, the method terminates with step S13.

What is claimed is:

1. A method for determining a degree of blindness of a radar sensor in a motor vehicle on the basis of a measurement of a receive power level of a radar echo, the method being carried out when at least one object is located by the radar sensor, the method comprising:
   determining an expected value E for the radar scatter cross-section of the object on the basis of known properties of objects to be located;
   estimating a radar scatter cross-section S of the located object based on a measured receive power level; and
   calculating an indicator K for the degree of blindness of the radar sensor as a monotonically increasing function of a difference between the estimated radar scatter cross-section S and the expected value E.

2. The method as recited in claim 1, wherein the indicator K is an exponential function of the difference S–E.

3. The method as recited in claim 1, further comprising:
pre-filtering located objects to exclude objects for which the radar signal contains indications of a possible falsification of the radar scatter cross-section S.

4. The method as recited in claim 1, wherein various expected values for different classes of objects are stored, and, when an object is located on the basis of the radar echo, the associated object class is determined and the expected value is determined on the basis of the object class.

5. The method as recited in claim 1, wherein the steps of the method are carried out multiple times for a plurality of objects located simultaneously or one after the other, and at least one of the obtained radar scatter cross-sections and the indicators are statistically evaluated.

6. A radar sensor for motor vehicles, comprising:
a control and evaluation device configured to determine a degree of blindness of a radar sensor in a motor vehicle on the basis of a measurement of a receive power level of a radar echo, the control and evaluation device, configured to, when at least one object is located by the radar sensor:
determine an expected value E for the radar scatter cross-section of the object on the basis of known properties of objects to be located,
estimate a radar scatter cross-section S of the located object based on a measured receive power level, and
calculate an indicator K for the degree of blindness of the radar sensor as a monotonically increasing function of a difference between the estimated radar scatter cross-section S and the expected value E.

\* \* \* \* \*